March 10, 1953  C. E. EARLE ET AL  2,631,185
AUTOMATIC ELECTRICAL AND MECHANICAL COUPLING
Filed June 7, 1950
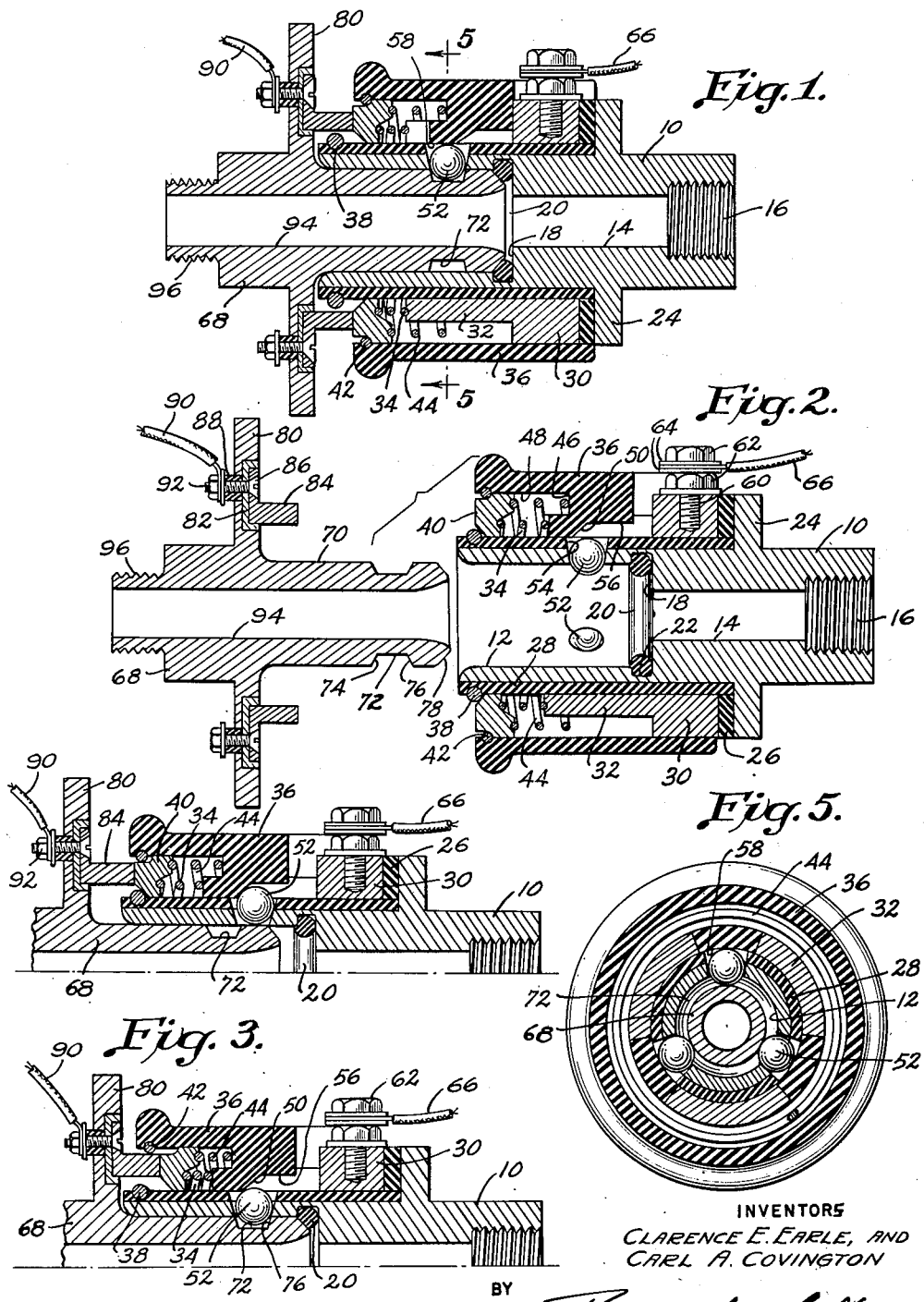
INVENTORS
CLARENCE E. EARLE, AND
CARL A. COVINGTON
BY Raymond W. Bolton
ATTORNEY Patented Mar. 10, 1953

2,631,185

UNITED STATES PATENT OFFICE 2,631,185

AUTOMATIC ELECTRICAL AND MECHANICAL COUPLING

Clarence E. Earle, Washington, D. C., and
Carl A. Covington, Alexandria, Va.

Application June 7, 1950, Serial No. 166,632

5 Claims. (Cl. 173—326)

This invention relates to couplings adapted to produce both electrical and mechanical connections for a wide variety of uses. The invention is particularly concerned with the production of mechanical and electrical joints wherein a detent is actuated to hold the members in coupled relationship by the mere act of pushing the coupling members towards one another. The coupling is preferably further characterized by what may be called a semi-automatic release of the members, one from the other, when it is desired to uncouple them mechanically and electrically. The coupling of the present invention is applicable to rod and pipe joints of various types and embodies some of the features of Reissue Patent No. 23,120, issued to Clarence E. Earle and Carl A. Covington on June 14, 1949.

The mechanical and electrical coupling of the present invention comprises first and second joint members, detent and detent actuating elements carried by the first member, a detent operator carried by the first member for actuating the elements, an abutment carried by the second member engageable with the operator when the members are coupled, electrical conductors carried by the members for interconnection when the members are coupled, and insulating means interposed between the conductors and members. The operator is provided with means biasing it in one direction, which means is overcome when the abutment engages the operator in a coupling operation. An annular cam element is preferably carried by the first coupling member for actuating a plurality of detents, which may assume the form of radially displaceable ball elements.

In its preferred form, the coupling comprises means biasing the operator in one direction and the detent actuating element towards the detent element. More specifically, the coupling comprises a spring interposed between the first member and operator, and a spring interposed between the detent actuating element and the operator, which springs may be concentric compression springs. The second member is preferably provided with a detent receiving recess to receive the one or more detents carried by the first member under the influence of the action of the abutment upon the operator during a coupling operation. The actuating element is preferably movable towards the second member to release the one or more detent elements during an uncoupling operation. When it is desired to maintain a fluid seal between the members in their coupled relationship, a suitable sealing element is interposed between them. Couplings of the type here under consideration are frequently identified as of the snap acting type, an effect which is produced by compressing one or more springs during the coupling operation until the detent means and recess therefor come into registry, at which point, the detent means will enter the recess under the effect of the compressed spring or springs. There is also a tendency in the coupling of the present invention to become separated during an uncoupling operation by the mere retraction of the actuating element to release the detent, which tendency is also produced by one or more springs maintained under compression throughout the period during which the members are coupled.

The detent operator is preferably electrically conductive and the abutment is also preferably electrically conductive so that conductors connected with the operator and abutment will become interconnected during a coupling operation. The coupling is also provided with means insulating the operator and abutment from the joint members. The joint members themselves may be electrically conductive, but the detent actuating element is preferably non-conductive or at least partially so to produce the preferred circuit relationships. One or more springs may be included in the circuit produced by the joint members, in which case, they will preferably be maintained electrically isolated from the joint members. Although the electrical and mechanical joints can be completed simultaneously in accordance with the present invention, in many cases it will be preferred to produce these joints sequentially during the coupling operation.

A more complete understanding of the invention will follow from a detailed description of the accompanying drawings wherein:

Fig. 1 is a sectional elevation depicting the joint members in coupled relationship;

Fig. 2 is a sectional elevation depicting the joint members in their uncoupled relationship;

Fig. 3 is a fragmentary sectional elevation depicting an intermediate position of the joint members as they are being coupled;

Fig. 4 is a fragmentary sectional elevation of the joint members at the beginning of an uncoupling operation; and Fig. 5 is a section taken along line 5—5 of Fig. 1.

The first joint member or socket member 10 provides an open socket 12 at one end connected by a reduced bore 14 with an internally threaded portion 16 at its other end. A shoulder 18 between the socket portion 12 and reduced bore 14 affords a bearing surface for a sealing gasket 20 of toroidal shape and suitably formed of rubber, fitted to a counterbore 22 adjacent the shoulder 18. The socket member is provided with an external flange 24 which serves as an abutment for an insulating disk 26 and an insulating sleeve 28 extending to the socket end of the member. A conducting ring 30 surrounds the insulating sleeve 28 and abuts against the insulating disk 26, and has a plurality of longitudinally extending conducting fingers 32 serving as abutments for a conducting spring 34 and serving the further function of guiding a non-conducting sleeve 36 of a suitable plastic composition or the like. Near the open end of the socket member, the insulating sleeve 28 is grooved to receive a retaining ring 38 to limit the outward movement of an operator 40 housed within the sleeve or detent actuating element 36 and limited in its movements with respect thereto by means of another retaining ring 42 seated in a groove formed internally near the open end of the detent actuating sleeve 36. The operator 40 is urged into contact with the retaining ring 42 by means of a spring 44 interposed between it and a shoulder 46 formed in the cam actuating element 36 at the bottom of a counterbore 48. The cam actuating element or sleeve 36 is formed with an internal cam surface 50 which cooperates with detent elements or balls 52 received in inwardly convergent radial pockets 54 formed through the wall of the socket member 10 and its insulating sleeve 28. The internal cam surface 50 intersects a cylindrical wall 56 formed within the sleeve 36 to define an annular chamber into which the balls 52 can move radially in their retracted positions as required during coupling and uncoupling operations. The detent actuating sleeve also provides a reduced cylindrical bore 58 which serves to confine the balls in their latching positions to maintain the coupling members in assembled relationship.

The annular ring 30 is tapped to receive a screw 60 equipped with suitable nuts 62 and washers 64 for securing a conductor 66 for the completion of an electrical circuit.

The second joint member or plug member 68 has an external cylindrical wall 70 substantially complementary with the socket 12, interrupted intermediate its length by a recess or groove 72 having inclined walls 74 and 76 for cooperation with the balls 52. The plug member has a convergent leading edge 78 which causes the balls 52 to move radially outwardly as the coupling operation proceeds, until ultimately, the leading edge will enter into sealing relationship with the gasket 20. An external flange 80 formed on the plug member is recessed to receive an insulating insert 82 of annular form, or a plurality of such inserts circumferentially spaced about the flange. Each such insert may be provided with an abutment 84 projecting towards the leading edge of the plug member for engagement with the operator 40 carried by the socket member. One or more screws 86 penetrating the abutment 84 and its insulating insert 82, will extend through an insulating collar 88 to the opposite side of the flange 80 where a conductor 90 can be attached by means of a nut 92. As shown, the plug member is provided with an internal bore 94, terminating remote from the leading end in external threads 96 for connection of any desired type of fitting.

With the members in the positions depicted in Fig. 2, a coupling operation is effected by introducing the plug member 68 into the socket member 10, the convergent leading edge 78 engaging the balls 52 to move them outwardly into the chamber defined by the bore 56, the abutment 84 subsequently engaging the operator 40 and moving it to the right against the force of the spring 34 so long as the balls 52 impede movement of the cam actuating element 36 by their position in the path of the cam surface 50. As soon as the groove 72 comes into registry with the balls however, the cam surface 50 will force them into the groove with a snap action, whereupon the cam actuating element will move to the right and the confining surface 58 will retain the balls in their confined positions.

As shown in Fig. 3, the abutment 84 has engaged the operator 40 and has partially compressed the spring 34 since the balls 52 obstruct movement of the detent actuating element 36 to the right. From this figure, it will appear that the groove 72 has not yet advanced into registry with the balls 52, but this condition will occur as the plug member is moved farther into the socket member. The coupled relationship of the members has been shown in Fig. 1, wherein the balls are confined in the groove 72 to definitely latch the members together, and, by virtue of the sealing gasket 20, in fluid tight relationship.

When it is desired to uncouple the members, the cam actuating element 36 is moved to the left from the position shown in Fig. 1, against the force of the spring 44 to uncover the balls 52 and permit them to move into the chamber defined by the counterbore 56 within the detent actuating element 36. Upon release of the balls in this manner, they are forced outwardly by the inclined wall 76 of the groove 72, in view of the fact that the effects of both of springs 34 and 44 are transmitted through the operator 40 to the abutment 84 and thereby to the plug member 68 tending to eject it from its position within the socket member.

It will be clear that the circuit from the conductor 66 will be completed through the screw 60 and conducting ring 30, conducting fingers 32, spring 34, operator 40, abutment 84, screw 86, and conductor 90.

Whereas only one form of the invention has been illustrated in the drawings, many variations will occur to those skilled in the art after having the benefit of the present disclosure. Accordingly, the invention should not be limited to the single form illustrated beyond the scope of the appended claims.

We claim:

1. A mechanical and electrical coupling comprising first and second joint members, detent and detent actuating elements carried by said first member, a detent operator carried by said first member and insulated therefrom for actuating said elements, an abutment carried by said second member and insulated therefrom engageable with said operator when said members are coupled, electrical conductors carried by said members for interconnection when said members are coupled, and insulating means interposed between said conductors and members.

2. A mechanical and electrical coupling comprising first and second joint members, detent and detent actuating elements carried by said first member, a conductive detent operator carried by said first member for actuating said elements, a conductive abutment carried by said second member engageable with said operator when said members are coupled, means for connecting electrical conductors to said operator and abutment, and means insulating said operator and abutment from said members.

3. A mechanical and electrical coupling comprising first and second electrically conductive joint members, a detent and a non-conductive detent actuating element carried by said first member, a conductive detent operator carried by said first member and insulated therefrom for actuating said elements, and a conductive abutment carried by said second member and insulated therefrom engageable with said operator to actuate said detent and close an electrical circuit when said members are coupled.

4. A mechanical and electrical coupling comprising first and second joint members, a detent and a non-conductive detent actuating element carried by said first member, a conductive detent operator carried by said first member for actuating said elements, a conductive spring interposed between said actuating element and first member, a conductive abutment carried by said second member engageable with said operator to actuate said detent and close an electrical circuit when said members are coupled, and means insulating said operator, spring and abutment from said members.

5. A mechanical and electrical coupling comprising first and second joint members, a detent and a detent actuating element carried by said first member, a conductive detent operator carried by said first member for actuating said elements, a conductive abutment carried by said second member engageable with said operator to sequentially complete an electrical circuit and actuate said detent when said members are coupled, and means insulating said operator and abutment from said members.

CLARENCE E. EARLE.
CARL A. COVINGTON.

REFERENCES CITED

The following references are of record in the file of this patent:

UNITED STATES PATENTS

| Number | Name | Date |
| --- | --- | --- |
| Re. 23,120 | Earle et al. | June 14, 1949 |
| 500,822 | Strauss | July 4, 1893 |
| 651,326 | Fowler | June 5, 1900 |